No. 755,930. PATENTED MAR. 29, 1904.
J. P. PRENTICE.
CUTTER HEAD FOR FLUE CLEANERS.
APPLICATION FILED FEB. 24, 1902.
NO MODEL.
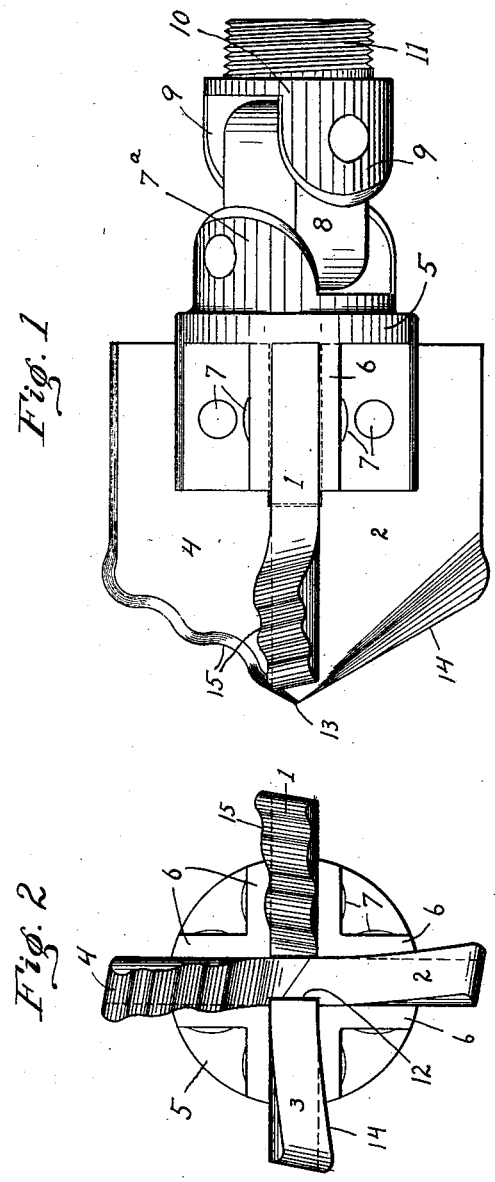

No. 755,930. Patented March 29, 1904.

UNITED STATES PATENT OFFICE.

JOHN P. PRENTICE, OF BARBERTON, OHIO, ASSIGNOR TO THE STIRLING COMPANY, OF JERSEY CITY, NEW JERSEY, A CORPORATION OF NEW JERSEY.

CUTTER-HEAD FOR FLUE-CLEANERS.

SPECIFICATION forming part of Letters Patent No. 755,930, dated March 29, 1904.

Application filed February 24, 1902. Serial No. 95,311. (No model.)

*To all whom it may concern:*

Be it known that I, JOHN P. PRENTICE, a resident of Barberton, in the county of Summit and State of Ohio, have invented a new and useful Improvement in Cutter-Heads for Tube-Cleaners; and I do hereby declare the following to be a full, clear, and exact description thereof.

My invention relates to a tool for cleaning boiler-tubes and the like, and more especially to a tool which is adapted to be driven by means of a turbine or similar motor.

The object of my invention is to provide a tool of this character which is simple in construction, strong, and efficient in operation.

In the accompanying drawings, Figure 1 is a side view of my improved tool, and Fig. 2 is a front end view of the same.

The tool is provided with four radially-disposed cutting-blades 1, 2, 3, and 4, which may be constructed in any suitable or convenient way, either as four separate pieces or all in one integral piece, but they preferably are constructed from two flat plates, as shown. These two plates are disposed in intersecting planes, and to permit this each is provided with a slot extending in from one end thereof and practically to its middle, the slot in one of said plates being cut in from its front end, while the slot in the other plate is cut in from its rear end, and said plates are then slipped together, so as to form the four radial wings or blades, as shown. The blades are mounted at their rear ends in the body or holder 5, which is provided with four pairs of radial ears 6, as shown, between which the radially-disposed blades are placed and in which they are secured, as by means of the rivets 7. The body 5 is provided on its rear end with the perforated ears 7, between which is pivoted the forward end of a link or block 8, the rear end of which is pivoted between the ears 9 of a coupling member 10, having a screw-threaded boss 11 for securing it to the turbine or other motor. The pivot-pins at the two ends of the link or block 8 are at right angles to each other, so that a universal coupling is formed. To relieve the ears 6 of some of the strain, the forward end of one of the plates is provided on one side with a groove 12 in which the other plate fits, so that the strain on said plate is taken up by the body of the other plate and not transmitted directly to the ears 6. The forward end of each blade slopes away toward the rear from the intersecting point 13, and these sloping ends are bent or forged slightly to one side, so as to form beveled or projecting cutting edges 14, which are somewhat similar to the cutting edge of an auger. The ends of one or more of the blades are waved or fluted, as shown at 15, two of the blades being shown thus shaped. The beveled cutting edges of the blades preferably extend slightly beyond the side edges thereof, as shown in Fig. 1, so that the side edges will not contact with the flues. As the side edges of the blades are not intended to do any cutting, they are left blunt.

The tool shown is exceedingly simple and is composed of a minimum of parts, each of which is of plain shape and easy to construct. The blades or bits can be quickly and cheaply made from plate-steel, while the body 5 will be made by casting.

In the use of the tool it will be connected to a turbine or other motor and put in rapid rotation in the tube, the universal coupling allowing it to fly outwardly and into contact with the entire surface of the tube. The sloping forward cutting edges will readily bore into any incrustation in the tube, and the edges will cut and break out such incrustation. When the bits become dull, they can be sharpened by grinding off the beveled sloping ends to form a new cutting edge.

What I claim as my invention, and desire to secure by Letters Patent, is—

1. A tube-cleaning tool having a body provided with a plurality of forwardly-projecting radially-disposed plates which meet or intersect at the longitudinal center of the tool, said plates having substantially parallel side edges and having their forward edges sloping backwardly from their points of intersection and formed as cutting edges which extend from their points of intersection to their side edges, the cutting edges of said plates being sinuous or waved on one side of the longitudinal axis and being straight on the opposite side of said axis, said body being provided at its rear end with a connection for a universal joint.

2. A tube-cleaning tool having a body provided with a plurality of forwardly-projecting radially-disposed blades or bits which meet or intersect at the longitudinal center of the tool, said blades having cutting edges on their forward ends extending from the longitudinal center of the tool and projecting beyond the side edges of said blades, said body being provided at its rear end with a connection for a universal joint.

3. A tube-cleaning tool comprising a body and two forwardly-projecting blades or bits secured to said body at their rear ends, each of said blades being provided with a slot from one end thereof for a portion of its length, said blades fitting each other in intersecting planes and being provided with cutting edges at their forward ends extending from their points of intersection to their side edges, said body being provided at its rear end with a connection for a universal joint.

4. A tube-cleaning tool comprising a body having four radial slots, and two broad flat blades or bits each of which is provided with a slot from one end thereof for a portion of its length, said blades fitting each other in intersecting planes and seated at their rear ends in the radial slots of the body and having their forward ends formed as cutting edges extending from their points of intersection to their side edges, said body being provided at its rear end with a connection for a universal joint.

In testimony whereof I, the said JOHN P. PRENTICE, have hereunto set my hand.

JOHN P. PRENTICE.

Witnesses:
JOHN FLICKINGER,
E. F. BAKER.